Oct. 8, 1929.   J. L. ISONHART   1,730,731
MIXER FOR INTERNAL COMBUSTION ENGINES
Original Filed March 7, 1927
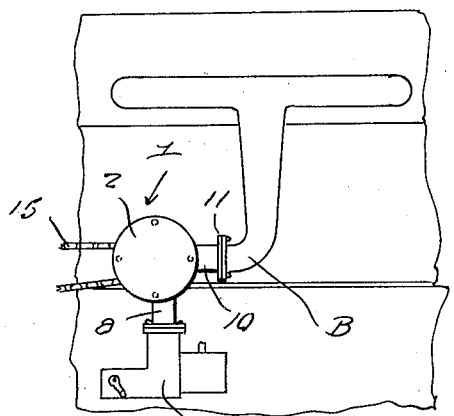
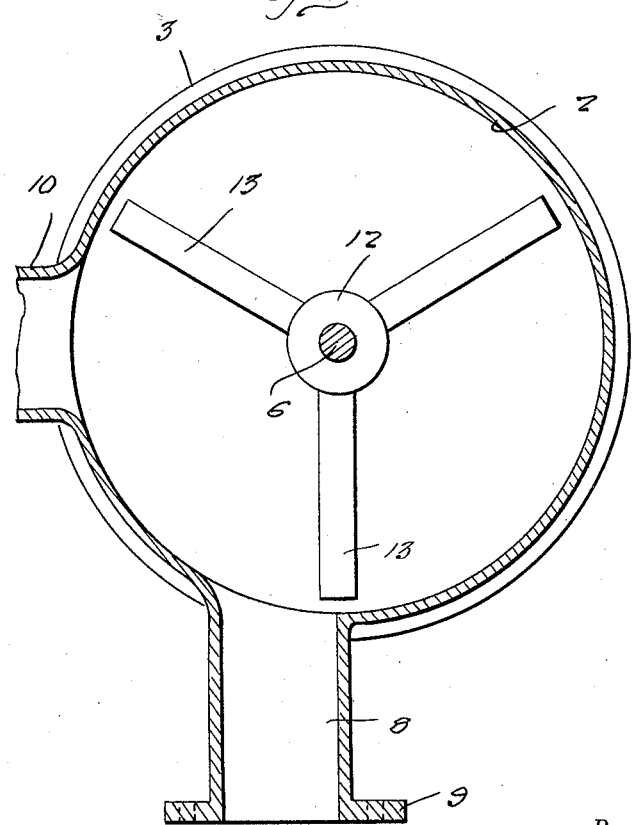
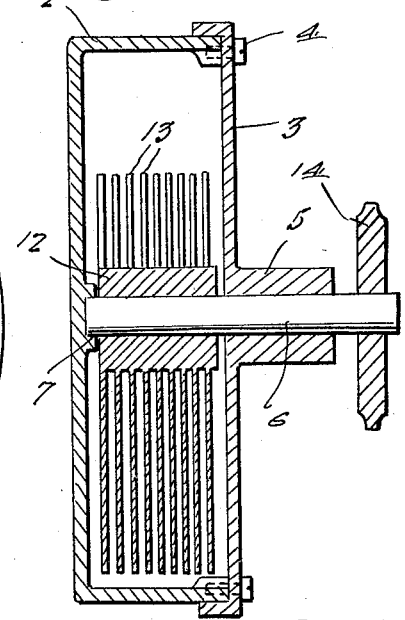
Inventor
John Lee Isonhart
By Clarence A. O'Brien
Attorney Patented Oct. 8, 1929

1,730,731

UNITED STATES PATENT OFFICE

JOHN L. ISONHART, OF DAVENPORT, IOWA

MIXER FOR INTERNAL-COMBUSTION ENGINES

Application filed March 7, 1927, Serial No. 173,454. Renewed June 27, 1929.

The present invention relates to improvements in atomizing devices for use in conjunction with internal combustion engines, and has for its principal object to provide a simple and efficient device, which may be readily and easily installed on an internal combustion engine to provide a fitting between the outlet of the carburetor and the inlet of the engine intake manifold, whereby the fuel will be broken up into fine particles before the same enters the intake manifold.

One of the important objects of the present invention is to provide a mixer of the above mentioned character, which will increase the efficiency of the operation of the internal combustion engine by breaking up the fuel charge into fine particles before the same enters the intake manifold so as to insure the proper combustion of the charge in the engine.

A further and important object of the invention is to provide a mixer of the above mentioned character, which comprises a casing having an inlet and outlet communicating with the carburetor and intake manifold respectively, a fan being arranged within the casing and adapted for rotation in any suitable manner, the fan comprising a hub and series of radially extending blades, the blades in each series being closely spaced apart and extending for the whole length of the hub, thereby to insure the proper atomization of the fuel before the same is discharged through the outlet pipe.

A further object is to provide an atomizer of the above mentioned character, which may be readily and easily installed without necessitating any material alterations of the parts of the internal combustion engine with which the device is to be associated, the same being further simple in construction, strong and durable, and further well adapted to the purpose for which it is designed.

Other objects and advantages of the invention will become apparent during the course of the following detailed description, taken in connection with the accompanying drawings.

In the accompanying drawing, forming a part of this application and in which like reference characters designate like parts throughout the views:

Figure 1 is a side elevation of the atomizer embodying my invention showing the same mounted on an internal combustion engine.

Figure 2 is an enlarged vertical sectional view, through the fan casing showing the fan in side elevation, and Figure 3 is a vertical sectional view through the fan casing and its cover plate, showing the manner in which the blades of each series are spaced with respect to each other on the hub.

In the drawings, wherein for the purpose of illustration is shown the preferred embodiment of my invention, the numeral 1 designates generally my improved atomizer, the same comprising an enlarged circular casing 2, which has its rear side open. A removable closure 3, is provided for the open side of the casing and the securing means therefor is shown at 4. A boss 5 is formed centrally on the outer face of the cover plate 3 and this boss is formed with a longitudinal bore which registers with a suitable opening formed centrally in the cover plate, in the manner clearly illustrated in Figure 3. The board boss 5 provides a bearing for the intermediate portion of the transversely extending driven shaft 6, which extends into the casing and has its inner end journaled in a suitable bearing 7 provided therefor on the inner face of the closed side of the casing, in the manner clearly shown in Figure 3.

The circular casing 2 is provided with an inlet 8 which is adapted for communication with the outlet of the carburetor A and attaching flange 9 is formed on the lower end of this inlet pipe, to be readily attached to the flanged upper end of the outlet of the carburetor. The casing is further provided with an outlet pipe 10, the same being adapted to communicate at its outer end with the lower end of the intake manifold B of the internal combustion engine, an attaching flange 11 being formed on the outer end of this inlet pipe to facilitate the attachment of the same to the flanged end of the intake manifold. In this manner the mixer will provide a fitting between the carburetor and the intake manifold, so that the mixture of the gas and air will necessarily pass through the casing before entering the intake manifold.

The mixer further includes the provision of a fan adapted for rotation within the casing 2 and this fan includes an elongated hub 12 which is secured on the inner end portion of the driven shaft 6, the ends of the hubs being spaced slightly from the respective sides of the circular casing.

Extending radially from the hub 12 are the series of blades 13. Each series are arranged in closely spaced relation with respect to each other, and these blades in each series extend for substantially the full length of the hub 12, in the manner as also clearly shown in Figure 3. Each blade is formed to provide an elongated flat strip and the strip lies in substantially the same plane throughout its entire length.

The shaft 6 may be driven in any suitable manner, and in the present instance, I have shown the driving means as comprising a sprocket wheel 14 secured on the outer end of the driven shaft 6 and over this sprocket wheel is trained a driving chain 15. This chain may be operated in any appropriate manner by the power plant of the automobile (not shown). As the means for driving the shaft forms no important part of the present invention, a detailed description thereof is thought unnecessary.

The provision of the closely spaced blades will insure the proper atomization of the fuel before the same is discharged from the casing 2, through the outlet pipe 10, so that the fuel will be broken up into fine particles, before the same enters the intake manifold, and thereby the complete combustion of the charge will be insured. In this manner, considerable expense will be saved in the operation of an internal combustion engine, and in addition to increasing the efficiency of operation of the internal combustion engine, the mixer may be readily and easily installed on the engine without necessitating any material alterations of the parts with which the device is to be associated.

While I have shown the preferred embodiment of my invention, it is to be understood that various changes in the size, shape and arrangement of parts may be resorted to, without departing from the spirit of the invention or the scope of the appended claim.

Having thus described my invention, what I claim is:

In a mixer for internal combustion engines, a casing, an inlet pipe affording communication between the casing and the outlet of the carbureter of the engine, an outlet pipe connecting the casing with the intake manifold, a shaft extending centrally thru one side of the casing, the inner end thereof being journaled in the opposite side of the casing, groups of substantially flat blades projecting radially from the hub, the blades of each group being arranged on the hub in circumferentially coplanar relation with each other, and each group being disposed in longitudinal spaced relation on the hub.

In testimony whereof I affix my signature.

JOHN L. ISONHART.